Patented Dec. 18, 1934

1,984,669

UNITED STATES PATENT OFFICE 1,984,669

DEODORANT COMPOSITION

Harry Taub, New York, N. Y., assignor to Feminine Products, Inc., New York, N. Y., a corporation of New York No Drawing. Application November 4, 1932, Serial No. 641,231

6 Claims. (Cl. 167—90)

This invention relates to cosmetic preparations of the nature of perspiration deodorizing and inhibiting compositions.

Preparations heretofore proposed for treating skin areas to eliminate the unpleasant effects of perspiration are mainly in the form of liquids containing powerful aluminum compounds of the nature of aluminum chloride which act to close the skin pores and so prevent the flow of perspiration for extended periods. These preparations are unsatisfactory in that due to the aluminum chloride therein they are injurious to fabrics and accordingly must be allowed to dry out completely on the treated skin area before clothing is brought into contact therewith. A more serious objection to aluminum chloride preparations is the harsh and irritating nature of this ingredient which makes the use of such preparations painful and often injurious to the skin.

Preparations have heretofore been proposed which avoid the use of aluminum chloride or similar irritating compounds and act primarily to deodorize perspiration rather than to prevent its flow. Such compounds are obviously unsatisfactory in that even when deodorized, perspiration is objectionable. Further, such compounds are quickly washed off the treated skin areas by the perspiration flow and the deodorizing effect is therefore lost.

With the above and other considerations in mind, it is proposed in accordance with the present invention to provide an improved perspiration inhibiting and deodorizing compound in wax-like or substantially solid form which acts more to absorb and deodorize perspiration than to prevent its flow and which is non-irritating to the skin and non-injurious to fabrics. In certain forms of my invention, a mild ingredient or ingredients may be included to restrict the flow of perspiration to a certain extent, but the use of aluminum chloride or like harsh irritants is avoided.

In general, my improved preparation comprises a highly absorptive base capable of absorbing large quantities of liquids together with an antiseptic deodorant capable of effectively deodorizing perspiration absorbed by the base. The noted ingredients are preferably combined with a wax-like carrier which gives the proper consistency to the composition. The antiseptic deodorant may be mildly astringent, and any unpleasant skin sensation due to such astringent action may be prevented by the use of a cutaneous sedative. I entirely avoid the use of aluminum chloride or like harsh irritants.

In one modification of the invention, I prefer to include an additional ingredient which counteracts the secretion of perspiration but which at the same time is non-irritating.

I prefer to employ zinc sulphocarbolate as the antiseptic deodorant of my preparation. This material is capable of effectively deodorizing perspiration and also has a mild and non-irritating astringent action. Zinc sulphocarbolate is particularly suitable for application to the skin. The absorptive base of my preparation is preferably a highly refined non-rancidifying material derived from anhydrous lanolin. Products thus derived are known as absorption bases and comprise thick neutral liquids having the property of absorbing many times their weight of water. Suitable absorption bases of this type are sold under the trade names, "Absorbine base" and "Falba base". In the appended claims, I have used the term "absorption base" to denote a lanolin derivative ingredient of the type here described.

To give my preparation a suitable wax-like consistency, I may employ one or more of a wide variety of ingredients. I prefer to use for this purpose a synthetic wax of the type known as glyco wax since ingredients of this nature are free from any possibility of decomposition and mix perfectly with the other ingredients of my preparation. In place of synthetic wax, I may use natural, animal, vegetable or mineral waxes such as spermaceti, beeswax, paraffin, carnauba, etc., or I may employ mixtures including any or all of such waxes, compounded with mineral oil or petrolatum, if necessary, to give the proper consistency.

As a cutaneous sedative, I prefer to use zinc oleate, although other materials, such as mineral oil or petrolatum, may be employed.

In a modified form of the invention, I include a further ingredient to counteract the secretion of perspiration. This ingredient is preferably aluminum palmitate, a water-proof dusting powder, which, although possessing some astringent properties, does not have the painful or injurious effects of aluminum chloride.

Perfumes of any suitable type may be added, if desired, and such perfumes as oil of bey, oil of cloves, lavender oil and oil of bergamot or various mixtures of such substances have been found satisfactory.

The proportions in which the above ingredients may be employed to form my improved composition may be widely varied with satisfactory results. Thus, the preparation may be composed of from 3 to 15% zinc sulphocarbolate; from 15 to 40% absorption base; from 5 to 25% cutaneous sedative of the nature of zinc oleate and from 20 to 60% wax or equivalent material, the proportions being given by weight. When the aluminum palmitate is included, from 5 to 15% by weight of this ingredient may be employed. The perfume, when used, may comprise up to 1% by weight of the preparation.

Although the invention is not limited to any exact proportions of ingredients, the following proportions by weight have been found to give a very satisfactory product:

|  | Per cent |
|---|---|
| Zinc sulphocarbolate | 6.5 |
| Zinc oleate | 13.2 |
| Absorption base | 26.3 |
| Glyco wax | 53 |
| Perfume | up to 1 |

The following proportions by weight make a suitable preparation including aluminum palmitate:

|  | Per cent |
|---|---|
| Zinc sulphocarbolate | 6 |
| Zinc oleate | 12 |
| Aluminum palmitate | 9 |
| Absorption base | 24 |
| Glyco wax | 48 |
| Perfume | up to 1 |

The composition may be prepared by various methods and I have found that the following method is satisfactory. The zinc sulphocarbolate and zinc oleate (and the aluminum palmitate if this ingredient is used) are first rubbed together to a very fine powder. The wax is then liquefied and mixed with the absorption base, and this liquid mixture is added to the powdered ingredients. The mass is stirred until almost solidified and then poured into molds and allowed to set.

My improved perspiration inhibiting composition may be very conveniently used by rubbing the surface of a stick or block thereof over the skin areas requiring treatment whereby a layer or film of the composition is conveniently applied to the skin. The composition does not soil the fingers or rub off on the clothing, and may be conveniently carried and used without spilling or waste.

The action of my improved composition is unique in that the perspiration is absorbed by the absorption base and is deodorized by the antiseptic zinc sulphocarbolate while retained by the base. Thus, the deodorizing action is prolonged and complete and, at the same time, the moistening of the skin or clothing by perspiration is prevented. The wax gives the absorption base a solid coherent consistency and prevents the removal of the preparation by the flow of perspiration or by contact with the clothing. The mild astringent action of the zinc sulphocarbolate (and of the aluminum palmitate when used) limits the secretion of perspiration to a degree sufficient to prolong the effective deodorizing action without injury to the skin pores or tissues, and the cutaneous sedative prevents any unpleasant or irritating sensation from the mild astringent action.

I claim:

1. A solid wax-like perspiration deodorizing and inhibiting preparation comprising an absorption base, an effective perspiration deodorant and at least one wax-like ingredient.

2. A solid wax-like perspiration deodorizing and inhibiting preparation comprising an absorption base, an antiseptic and mildly astringent perspiration deodorant, a cutaneous sedative and at least one wax-like ingredient.

3. A solid wax-like perspiration deodorizing and inhibiting preparation comprising an absorption base, zinc sulphocarbolate and wax.

4. A solid wax-like perspiration deodorizing and inhibiting preparation comprising an absorption base, zinc sulphocarbolate, zinc oleate and a synthetic wax.

5. A solid wax-like perspiration deodorizing and inhibiting preparation comprising an absorption base, an effective perspiration deodorant, a mild astringent, a cutaneous sedative and wax.

6. A solid wax-like perspiration deodorizing and inhibiting preparation comprising an absorption base, zinc sulphocarbolate, aluminum palmitate, zinc oleate and wax.

HARRY TAUB.